United States Patent Office 3,240,746
Patented Mar. 15, 1966

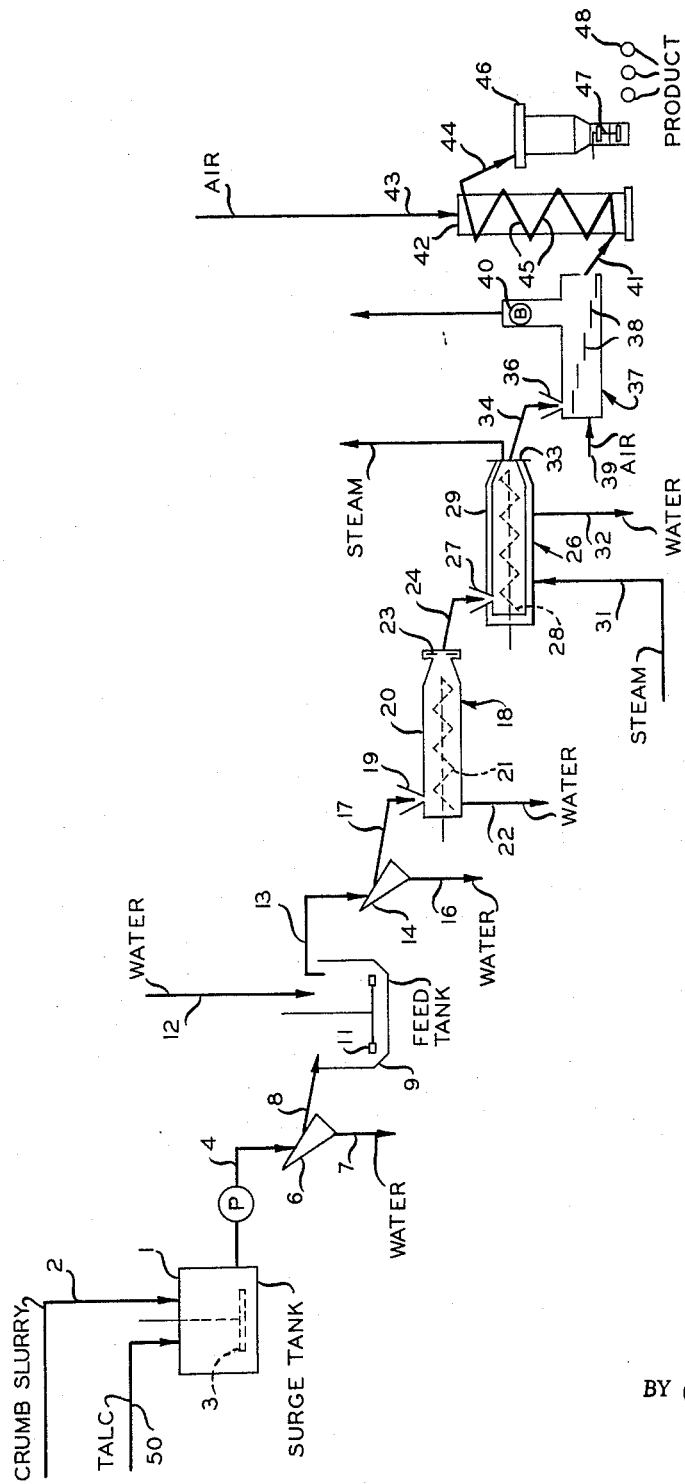

3,240,746
REMOVAL OF WATER FROM SOLID ELASTOMERS
Charles L. Davis, Borger, Tex., assignor to Phillips Petroleum Company, a corporation of Delaware
Filed Feb. 19, 1962, Ser. No. 174,000
6 Claims. (Cl. 260—41.5)

This invention relates to the removal of water from water slurries of solid elastomers. In another aspect, it relates to an improved method for mechanically removing physically combined water from water slurries of solid elastomers, such as cis-1,4-polybutadiene.

In many industrial processes solid products are produced as dispersions, suspensions, or slurries in water. Where the water content of such mixtures is high, such as 50 weight percent, or more, the removal of the bulk of the physically combined water (i.e., free water and occluded water) from the solid product by thermal heating or air drying is not feasible or economically advantageous. Accordingly, it has been found advantageous to remove the bulk of the physically combined water by mechanical dewatering processes. Processes of the latter type have been found particularly advantageous in the synthetic rubber industry where the water content of slurries of solid elastomer coagulum or crumb can be reduced to one weight percent or lower. Such mechanical dewatering processes generally utilize a combination of mechanical devices, such as shaker screens, mechanical screw presses (expellers), mechanical dryers (expanders), vibrating conveyors, etc. Though such mechanical handling and dewatering equipment has been proven advantageous, the efficient operation of such equipment is often hampered because of the sticky or tacky nature of the wet solid product. For example, in mechanically handling and dewatering water slurries of wet, hot elastomer crumb, the sticky elastomer tends to stick to conveyor belts, screw conveyors, drive shafts, etc., and gives rise to bridging in hoppers and plugging of pipes and outlets, ets.; as such, it often becomes necessary for the operator to manually clear away the elastomer obstructions, and sometimes shut down equipment for purposes of cleaning off the adhering, plugging and bridging elastomer, all of which means that the full efficiency of the equipment is not realized, operating expenses increase, and capacity decreases.

Accordingly, an object of this invention is to improve the mechanical removal of physically combined water from solid materials, such as elastomer crumb mixed with water in the form of a slurry. Another object is to remove the bulk of the physically combined water (i.e., free water and occluded water) from a water slurry of elastomer coagulum or crumb, such as cis-1,4-polybutadiene. Another object is to improve the efficiency of mechanical devices used in handling and dewatering wet, hot elastomer crumb. A further object is to prevent the inherent stickiness of such elastomer crumb from hindering the efficiency of mechanical handling and dewatering equipment used in drying such crumb. Further objects and advantages of this invention will become apparent from the following discussion, appended claims, and the single figure of the accompanying drawing where a schematic flow sheet illustrates a representative process of handling and mechanical dewatering a water slurry of elastomer crumb, with the novel features of this invention associated therewith.

Briefly, I have discovered that the mechanical handling and dewatering of the water slurries or like dispersions of solid material, such as elastomer crumb, can be improved by admixing with the slurry a small amount of talc (acid magnesium metasilicate).

Further understanding of the subject invention will be gained by consideration of the accompanying drawing. In the drawing, there is illustrated a conventional surge tank 1 for a water slurry of elastomer crumb, the slurry being supplied via line 2, usually at an elevated temperature, e.g., about 200° F., and having a water content in excess of 50 weight percent. Tank 1 is continuously agitated by a suitable agitator 3. The concentration of water in the slurry of elastomer crumb can vary, and usually will be at least 50 weight percent and may even be as high as 95 weight percent water. The slurry is continuously withdrawn from tank 1 and pumped via line 4 to a shaker screen 6 or the like where the bulk of the free water is removed via line 7. The thus partially dewatered elastomer crumb is then passed via line 8 to a suitable feed tank 9 or the like, provided with motorized paddle 11 or the like. Water is supplied to tank 9 via line 12 to cool the elastomer crumb, the temperature of the added water being usually between 65 and 105° F., preferably 75 to 85° F. The resulting diluted and cooled slurry overflows from tank 9 via line 13 to a second shaker screen 14 of the like where the bulk of the relatively cooler free water is removed via line 16. The partially dewatered and cooled elastomer crumb, with a water content of about 50 weight percent, is then passed via line 17 to suitable mechanical dewatering equipment 18, such as a water expeller or continuous mechanical screw press, for removal of occluded water. An expeller of this type which can be used is a V. D. Anderson Company No. 5 Moisture Expeller. In this type of apparatus, the elastomer crumb, drained of free water, is continuously fed to feed hopper 19 and passes through the length of the device by means of suitable worms or screws 21 within a barrel housing 20, such movement of the elastomer crumb causing compaction as well as mechanical working of the elastomer, thus inducing a flow of occluded water, between the barrel staves, which drains from the device via line 22. The compacted and dewatered elastomer crumb is then extruded from the outlet of the device where a built-in cutter 23 shreds the elastomer to the proper degree. The shredded elastomer crumb, now having a moisture content in the range of about 5 to 15 weight percent, is then preferably passed via line 24 to a mechanical dryer generally designated 26, such as a V. D. Anderson Company Expander-Dryer for further removal of the small amount of occluded water left in the elastomer crumb. In this type of apparatus 26, the elastomer crumb is fed into a hopper 27 and passed along the length of the device by means of suitable worms 28 or the like, the crumb being compacted to pressures, ahead of the discharge, of several hundred pounds per square inch. The mechanical energy of the shaft rotating against the crumb and the B.t.u. input from an external jacket 29, to which steam 31 is supplied, causes the apparatus to work as a heat exchanger. The water in the elastomer crumb is maintained in the liquid state along the length of the dryer, due to the pressure applied by the worm arrangement, and is not permitted to escape as vapor. The elastomer is finally passed through an opening in a dye plate 33 at an elevated temperature, e.g., about 300° F., the water flashing into vapor as it passes through the opening in the dye plate. This rapid expansion of the water into steam vapor as the mixture leaves the dryer 26 causes an expansion of the elastomer into a very porous structure, which permits the escape of any residual moisture in the elastomer. The elastomer in this expanded form will have a moisture content generally below one weight percent, e.g., 0.7 weight percent. The expanded elastomer can be passed via line 34 into the hopper 36 of a vibrating conveyor 37. The conveyor 37 is preferably provided with a cascade arrangement of vibrating plates 38 and as the elastomer crumb passes from one plate to the next plate it is caused to tumble forward by relatively cool air passed into the conveyor via line 39. A blower or the like 40 induces the flow of further air through other openings in the conveyor so as to remove the air heated by contact with the elastomer. This type of vibrating conveyor is fully described and claimed in copending application Serial No. 856,064, filed November 30, 1959, by C. L. Davis et al.

The particulate elastomer, having a relatively low moisture content, e.g., 0.5 weight percent, is removed from the vibrating conveyor 37 via line 41 and passed to suitable baling or packaging equipment. For example, the dried elastomer can be passed to a vibrating spiral elevator 42, to which air may be supplied at the top via line 43. The dried crumb is elevated by the upward jerking motion of flights 45, in a well-known manner, and dumped via line 44 into the upper open end of a baler 46, provided with a suitable piston arrangement 47 for the compression of the dried elastomer crumb into suitable bales 48.

Mention has been made hereinbefore of the inherent sticky or tacky nature of the wet, hot elastomer. As such, it would tend to adhere to various surfaces of the equipment described hereinbefore, or cause bridging of hoppers, and plugging of lines and outlets, etc. This is especially true in the case of the mechanically dewatering devices, such as expeller 18 and expander-dryer 26, where the adherence of the sticky elastomer to the various worms, collars, shafts, hoppers, and the like, impairs the efficient operation of these devices. Accordingly, I have discovered that this problem due to the inherent stickiness of the wet, hot elastomer can be overcome by adding to the water slurry of elastomer a small amount of talc. I prefer to add the talc in the form of a water suspension or slurry, although it can be added in its dry particulate form. And I prefer to add the talc via line 50 to the slurry surge tank 1, although I may add it to feed tank 9. Surprisingly, only a relatively small amount of talc is necessary to overcome the stickiness of the elastomer, even though the bulk of free water is removed from the slurry by passage over the shaker screens. Generally about 0.1 to 0.5 part of talc per 100 parts of elastomer can be used. Larger amounts can be used, but usually will be unnecessary to overcome the problem; moreover, use of large amounts of talc increases the ash content of the final elastomer product. Stated functionally, the amount of talc used in this inevntion is that sufficient to render the elastomer substantially non-sticky under the conditions of operation.

The following example illustrates the subject invention, but it should be understood that the various conditions, amounts, etc., recited in this example should not be construed to limit unduly this invention.

*Example*

A homopolymer of 1,3-butadiene of approximately 95 percent cis-1,4-addition is prepared by polymerizing butadiene in toluene solvent in the presence of an initiator comprising a mixture of triisobutylaluminum, titanium tetrachloride, and titanium tetraiodide. Following polymerization, the catalyst is inactivated and an anti-oxidant added. The solvent is removed by steam stripping, yielding a rubber having a Mooney viscosity (ML-4 at 212° F.) of 43.5. The rubber crumb is mixed with water to form a water slurry of about 5.7 weight percent rubber crumb. The slurry of rubber crumb is pumped at a rate of 135 gallons per minute and at a temperature of 200° F. to a slurry surge tank 1 of the accompanying drawing. About 10 gallons of a 40 weight percent water slurry of talc per each 30,000 gallons of elastomer slurry is added via line 50 to the surge tank 1. The slurry of elastomer and talc is agitated and continuously pumped via line 4 at the rate of 140 gallons per minute onto shaker screen 6, where the bulk of free water, at about 200° F., is removed. The wet elastomer is passed via line 8 to feed tank 9, where it is reslurried with water supplied via line 12 at the rate of 120 gallons per minute and at a temperature of 80° F. The cooled slurry of elastomer (and talc) overflows tank 9 at about 90° F. and is passed via line 13 to shaker screen 14, where the bulk of the free water is removed via line 16. The wet rubber crumb, having about 50 percent water, is then passed into expeller 18 at the rate of 3,030 pounds per hour. The thus dewatered elastomer, having a water content of about 5 percent, is then fed to expander-dryer 26, where it is further dried to about 0.7 weight percent water. The expanded dried elastomer is then passed by vibrating conveyor 37 to the bottom of the vibrating spiral elevator 42, in which it is elevated and cooled and the dried elastomer, having a water content of about 0.1 to 1 weight percent and a talc content of about 0.05 to 0.3 weight percent, is then baled in baler 46, wrapped, bagged, and conveyed to storage, etc. In this mechanical handling and dewatering of the elastomer, substantitally none of the elastomer sticks to equipment surface, plugs lines or outlets, blinds shaker screens, plugs or bridges, while being handled and dried.

It should be understood that this invention is applicable to water slurries of elastomers in general which have an inherent sticky nature when wet and hot. It is particularly applicable in the finishing of rubbery coagulum produced in emulsion polymerization processes for synthetic rubber, but can also be applied in the processing of coagulum of natural rubber latex. The synthetic elastomers which can be processed according to this invention include those made by emulsion polymerization of conjugated dienes having from 4 to 8 carbon atoms per molecule or the copolymerization of mixtures of such conjugated dienes or the copolymerization of such conjugated dienes with copolymerizable monomers containing the $CH_2{=}C{<}$ group, such as styrene. Copolymers of isoolefins and conjugated dienes in which the isoolefin has from 4 to 8 carbon atoms per molecule and is in a major amount and the conjugated diene has from 4 to 6 carbon atoms per molecule in a minor amount, known generally as butyl rubber, can be employed in this invention. Synthetic elastomers such as butadiene-styrene copolymers, butadiene-acrylonitrile copolymers, polybutadiene, polyisoprene, polychloroprene, and the like can be processed by this invention. The preparation of these polymers is well known and as an example thereof reference is made to U.S. Patent 2,426,427 issued August 5, 1958, to R. A. Findlay.

Various modifications and alterations of this invention will become apparent to those skilled in the art, without departing from the scope and spirit of this invention, and it should be understood that the preferred embodiments of this invention as outlined herein are illustrative and should not be construed to limit unduly this invention.

I claim:

1. In a process wherein a water slurry of an elastomer coagulum having a water content in excess of 50 weight percent is mechanically dewatered, the improvement comprising adding about 0.1 to 0.5 part of talc per 100 parts of said elastomer coagulum to said slurry, said elastomer being a polymer of a conjugated diene having 4 to 8 carbon atoms per molecule.

2. The process according to claim 1, wherein said polymer is a copolymer of said conjugated diene and a copolymerizable monomer containing the $CH_2{=}C{<}$ group.

3. The process according to claim 1, wherein said polymer is a copolymer of said conjugated diene and isoolefin having from 4 to 8 carbon atoms per molecule.

4. The process according to claim 1, wherein said elastomer is selected from the group consisting of butadiene-styrene copolymer, butadiene-acrylonitrile copolymer, polybutadiene, polyisoprene, polychloroprene, and butyl rubber.

5. An improved process for drying a water slurry of an elastomeric coagulum wherein said coagulum consists of a polymerized conjugated diene having 4–8 carbon atoms per molecule, said process comprising the steps of mixing 0.1 to 0.5 part of talc per 100 parts of said elastomeric coagulum with the said water slurry to reduce the tackiness of said elastomeric coagulum; draining any free water from said coagulum; mechanically compacting and working said drained coagulum to remove any occluded water thereform; compacting said coagulum at an elevated temperature and under a pressure sufficient to maintain any residual occluded water in said elastomeric coagulum in the liquid phase; and passing the hot compacted elastomeric coagulum to a zone of reduced pressure where said residual occluded water flashes as steam vapor.

6. The process according to claim 5, wherein said elastomer is a homopolymer of 1,3-butadiene of approximately 95 percent cis-1,4-addition.

References Cited by the Examiner
UNITED STATES PATENTS

| | | | |
|---|---|---|---|
| 2,854,426 | 9/1958 | Dasher | 260—41.5 |
| 2,953,556 | 9/1960 | Wolfe et al. | 260—94.7 |
| 3,004,940 | 10/1961 | King | 260—41.5 |

OTHER REFERENCES

Barron, "Modern Synthetic Rubbers," Chapman & Hall Ltd., London (1949), page 467.

"Compounding Ingredients for Rubber," 2nd edition, 1947, page 389, Bill Bros. Pub. Corp.

Heffer, "British Compounding Ingredients for Rubber," Research Assoc. of British Rubber Mfgrs., 1957, pp. 440–441.

Zimmerman et al.: "Handbook of Material Trade Names," Industrial Research Service, Dover, Del., 1953 ed., page 372.

MORRIS LIEBMAN, *Primary Examiner.*